SOIL CULTIVATING IMPLEMENTS

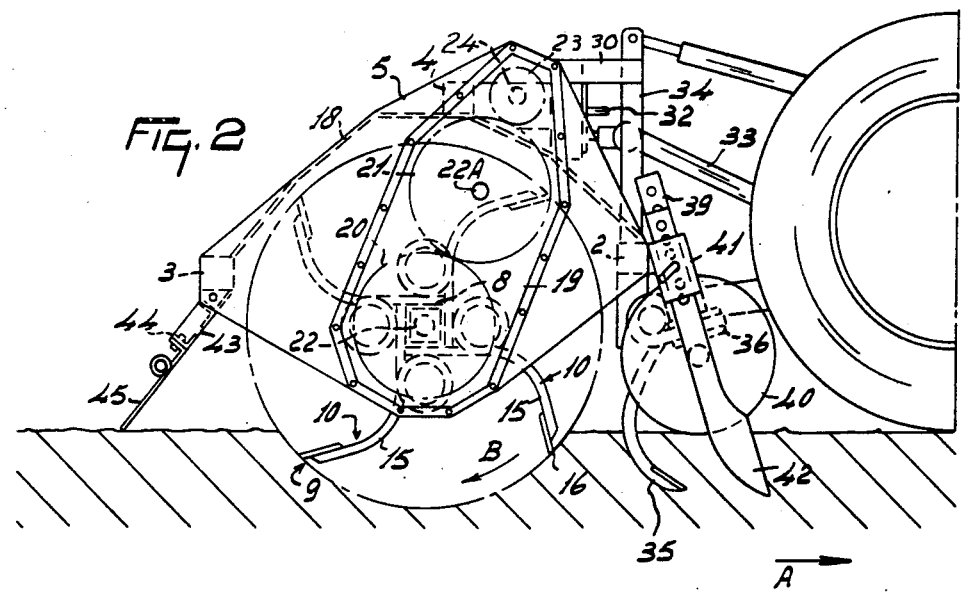

According to one aspect of the invention, there is provided a soil cultivating implement of the kind set forth, wherein a row of cultivator tines is carried by the frame at a location in front of the cultivating member with respect to the intended direction of operative travel of the implement, and wherein the cultivating member itself is provided with a plurality of resiliently supported tines.

Figure 1:
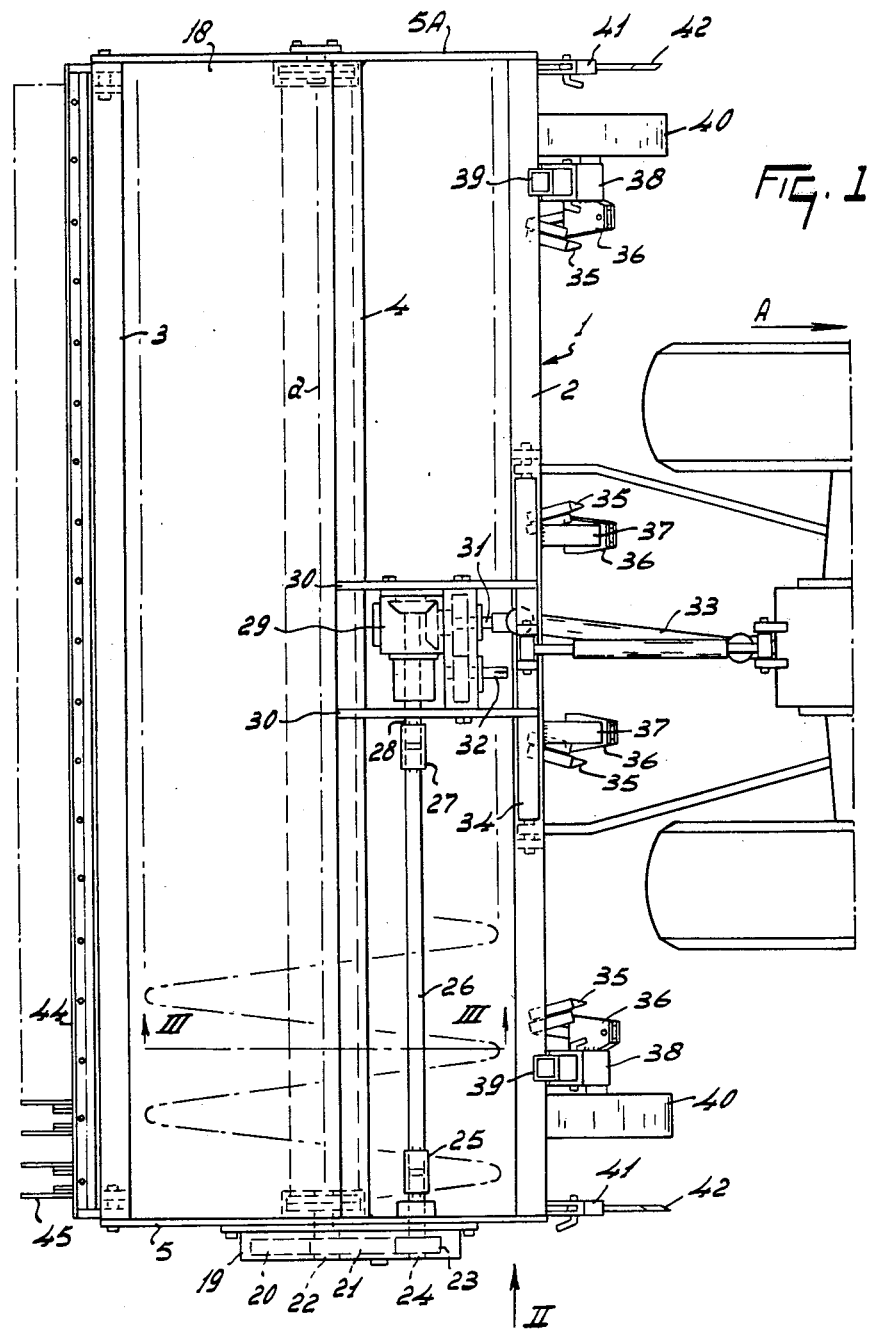
Figure 4:
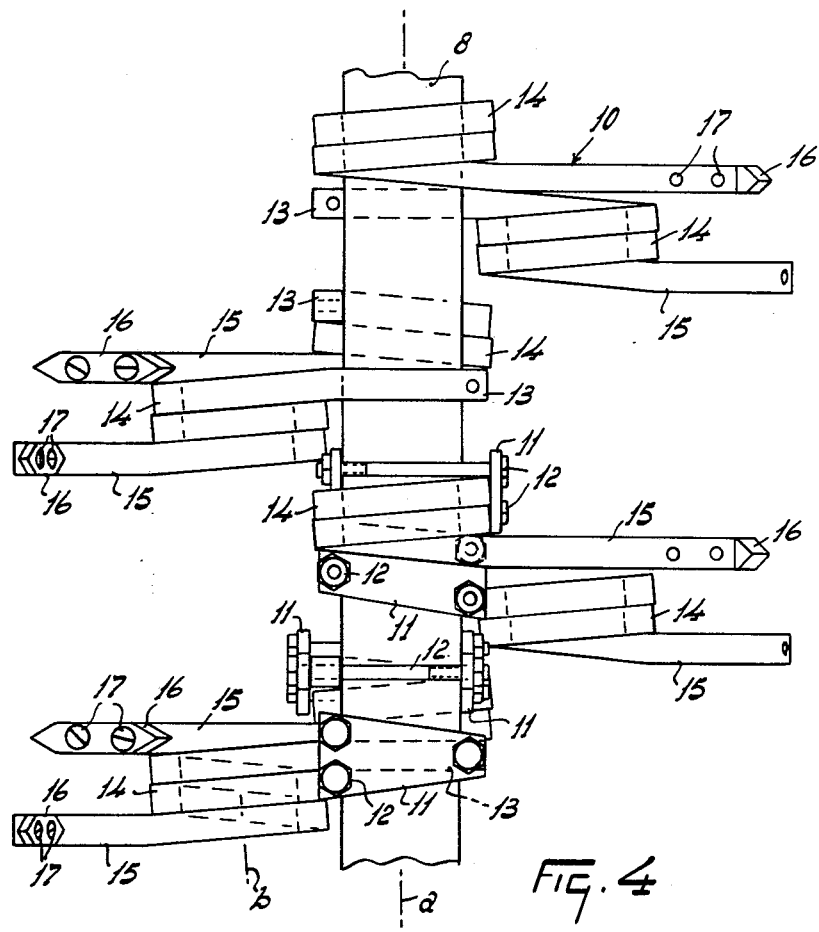
Figure 5:
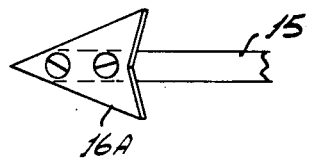

For a better understanding of the invention, and to show how the same may be carried into effect, reference will now be made, by way of example, to the accompanying drawings, in which:

FIG. 1 is a plan view of a cultivating implement or cultivator in accordance with the invention connected to the rear of an agricultural tractor, FIG. 2 is a side elevation as seen in the direction indicated by an arrow II in FIG. 1, FIG. 3 is a sectional elevation, along the line III—III in FIG. 1, to an enlarged scale, showing parts that can be seen in FIG. 2 of the drawings in greater detail, FIG. 4 is a plan view as seen in the direction indicated by an arrow IV in FIG. 3 but with the partial omission of some members, and FIG. 5 is a scrap plan view, to the same scale as FIGS. 3 and 4, illustrating an alternative embodiment of one part.

Referring to the drawings, the soil cultivating implement or cultivator that is illustrated has a frame that is generally indicated by the reference 1, said frame 1 comprising two substantially horizontal beams 2 and 3 that both extend transverse, and normally substantially perpendicular, to the intended direction of operative travel of the implement which is indicated by an arrow A in FIGS. 1 and 2 of the drawings. The beam 2 is located towards the front of the implement and the beam 3 at substantially the rear thereof with respect to the direction A, both beams 2 and 3 being of hollow formation and polygonal cross-section, a square cross-section, as illustrated, being preferred. When the cross-section is square or otherwise polygonal, at least one side of each of the two beams 2 and 3, as seen in cross-section, is horizontally or substantially horizontally disposed. It will be noted from FIG. 2 of the drawings that the rear frame beam 3 is at a slightly lower horizontal level than is the leading frame beam 2. As seen in plan view (FIG. 1), a third frame beam 4 extends parallel to the two beams 2 and 3 at a location substantially midway therebetween, said beam 4 actually being located at a higher horizontal level than either of the beams 2 and 3 (see FIG. 2), the beam 4 being of the same formation and disposition as the beams 2 and 3.

The implement frame 1 has opposite side plates 5 and 5A that rigidly interconnect the corresponding ends of the three beams 2, 3 and 4, said plates 5 and 5A being substantially vertically disposed in parallel relationship with one another and with the direction A. It will be seen from FIG. 2 of the drawings in respect of the side plate 5 that each of the two side plates 5 and 5A is of polygonal shape and has a lowermost obtuse-angled blunt tip which is located substantially centrally across the width of the plate with respect to the direction A. A central support 8 of a rotary cultivating member 9 is arranged substantially vertically above the downwardly directed blunt tips of the two side plates 5 and 5A at a horizontal level which is lower than that of either of the frame beams 2 and 3. A plurality of resiliently supported cultivating tines 10 are arranged along the length of the central support 8, which extends parallel to the beams 2, 3 and 4, outer parts of said tines 10 being located on an imaginary line that extends helically around the longitudinal axis $a$ of the support 8 (see FIGS. 1 and 4 of the drawings). With the preferred square cross-section of the central support 8 that is illustrated, successive tines 10 along the length of that support are secured to successive flat sides of the support by clamping members 11 that are in the form of plates and co-operating groups of three bolts 12. Each tine 10 has a fastening portion 13 that is clamped between a substantially trapezoidal plate of the corresponding clamping member 11 and one of the flat sides of the central support 8, said tine projecting to one side beyond the support 8 and there merging into a helical coil 14 that comprises at least two full 360° turns. The end of the coil 14 that is remote from the fastening portion 13 merges into an arcuately curved portion 15 that is directed forwardly with respect to the intended direction of operative rotation B (FIGS. 2 and 3) of the cultivating member 9. The portion 15 is of regularly curved configuration and it will be seen from FIG. 3 of the drawings that, towards its free end or tip, it tapers gently to a pointed edge. The tapering region has a replaceable blade 16 firmly but releasably secured to it by a pair of spaced countersunk machine screws 17.

In the illustrated embodiment which is being described, each tine 10 is afforded principally by the corresponding arcuately curved portion 15 and its replaceable blade 16. However, each arcuately curved portion 15, helical coil 14 and fastening portion 13 are formed integrally from a single length of spring steel or other resilient material that has a rectangular cross-section which it is preferred should be a square cross-section. The free end of each fastening portion 13 is formed with a hole through which is entered one of the corresponding group of three bolts 12 in order to ensure that the tine 10 concerned should still remain positively connected to the support 8 even when the clamping bolts 12 are loose. it will be noted from FIG. 4 of the drawings that each substantially trapezoidal plate of each clamping member 11 has its broad base, which co-operates with two of the corresponding group of three bolts 12, located at the end of the corresponding fastening portion 13 which immediately adjoins the corresponding helical coil 14. Each fastening portion 13 and the corresponding coil 14 afford a resilient support for the corresponding tine 10, the coil 14 of each resilient support being located rearwardly, with respect to the direction B, from the tine 10 concerned. Each coil 14 is located in the immediate proximity of one side of the central support 8 and, again with respect to the direction B, behind a plane which contains the free end or tip of the corresponding tine 10 and the longitudinal axis $a$ of the central support, said axis $a$ also being the axis of rotation of the support. Each coil 14 has its own longitudinal axis $b$ (FIGS. 3 and 4) and it will be noted that the longitudinal axes $b$ of two coils 14 that are located in the immediate proximity of opposite sides of the central support 8 are coplanar with the longitudinal axis $a$ of that support 8 itself. The axes $b$ are not, however, parallel to the axis $a$ but intersect the latter in such a way as to define acute angles of small magnitude at the points of intersection. When the member 9 is viewed in plan (FIG. 4), the longitudinal axes $b$ of all the coils 14 that are then located at one side of the central support 8 are all inclined in the same direction towards the axis $a$ of the support coulter 42 can thus be retained at a chosen depth setting having regard to the cultivating operation that is to be undertaken. The rear frame beam 3 is provided, at its opposite ends, with brackets 43 that are downwardly and rearwardly inclined with respect to the direction A. The lowermost ends of the brackets 43 carry a beam 44 of L-shaped cross-section in such a way that said beam 44 extends parallel to the frame beams 2, 3 and 4. The brackets 43 are, in fact, connected to the beam 3 in such a way that they can be turned relative thereto about an axis that is parallel to the length of said beam, means that is not illustrated in the drawings being provided to retain said brackets in any chosen angular position about that axis. A row of resilient tines 45 that are formed from spring steel wire or rod or the like is secured to the beam 44 by small clamping bolts in such a way that said tines 45 are regularly spaced apart from one another across the width of the implement. Each tine 45 has a straight operative portion that is integrally connected to a fastening portion by a corresponding helical coil. Conveniently, as illustrated, the tines 45 are formed in pairs from single lengths of spring steel wire or rod or the like, the two fastening portions of each pair being integrally interconnected and clamped to the beam 44 by a single bolt.

In the use of the coil cultivating implement or cultivator that has been described, its coupling member or trestle 34 is connected to the three-point lifting device or hitch at the rear of an agricultural tractor or other operating vehicle and the telescopic transmission shaft 33 is employed to place either the input shaft 31 or the input shaft 32 in driven connection with the power take-off shaft of the same tractor or other vehicle having regard to the speed of rotation of the cultivating member 9 that is required. As the implement moves over the land that is to be cultivated with the member 9 rotating in the direction B, the four resilient cultivator tines 35 that are the front of the implement with respect to the direction A break up a strip of land having a width of substantially 3 meters, the opposite edges of that strip being delineated by the two coulters 42. The lumps of soil that are excavated by the tines 35 are then engaged by the resiliently supported tines 10, those tines being directed forwardly with respect to the direction B but the direction B being such that said tines actually move rearwardly through the soil relative to the direction A. The tines 10 crumble the lumps of soil which they engage to a very large extent and a final smoothing action, which also crumbles any remaining lumps of soil that may be left on the ground surface, is effected by the downwardly and rearwardly inclined tines 45, said tines 45 being effectively adjustable in height by varying the angular position of the brackets 43 relative to the beam 3. The tines 10 are resiliently supported in a way which is particularly effective during the operation of the implement because the coil 14 that forms part of the resilient support for each tine 10 is arranged rearwardly from that tine with respect to the direction B so that the improved resiliency which is provided by each coil 14 can be utilised as much as possible while the risk of permanent bending, or actual breakage, of each coil 14 is very low. When inevitable wear or breakage reduces the efficiency of any one of the blades 16 to below an acceptable level, a new blade 16 can readily be substituted without replacing the whole of the tine 10 concerned. In fact, as will be evident from a study of FIGS. 3 and 4 of the drawings, each blade 16 can be removed from its operative position, inverted and turned end-for-end to present a new leading cutting edge before replacement of the whole blade is necessary thus effectively doubling the life of each blade 16 as compared with a non-reversible blade. Moreover, the releasability of the blades 16 by means of the machine screws 17 enables alternative blades to be employed when the nature and condition of the soil that is to be worked is such that alternative blades would produce a better result having regard to the final soil consistency that is required. FIG. 5 of the drawings illustrates one alternative example in the form of a non-reversible broader blade 16A of substantially arrowhead or regular inverse quadrilateral configuration. Other shapes of blade can, however, equally well be employed. The tines 10 are simply and effectively secured in their appointed positions by the clamping members 11 and the bolts 12 which co-operate with the square cross-section hollow central support 8. Despite being very effective, the support for the tines 10 is light in weight and any tine 10 that needs to be wholly replaced can quickly and easily be removed merely by undoing the appropriate bolts 12.

Although various features of the cultivating implement or cultivator that have been described and/or that are illustrated in the accompanying drawings will be set forth in the following claims as inventive features, it is emphasised that the invention is not necessarily limited to those features and that it includes within its scope each of the parts of the cultivating implement or cultivator that has been described, and/or that is illustrated in the accompanying drawings, both individually and in various combinations.

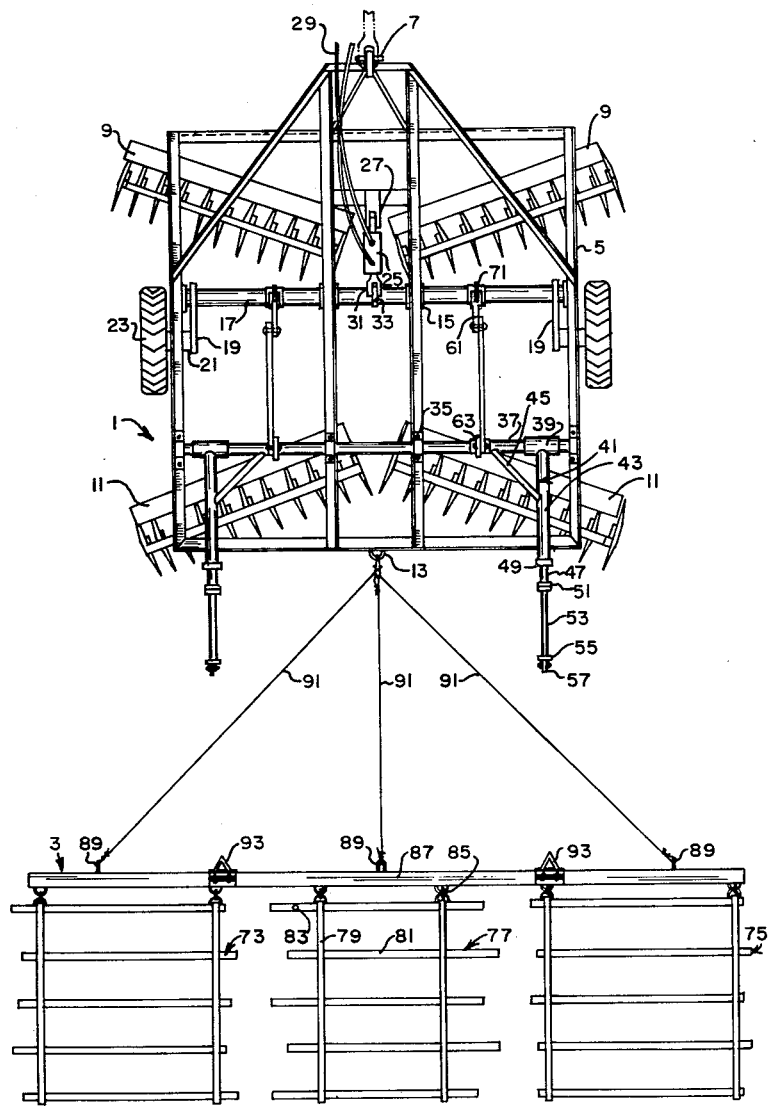

I claim:

1. A soil cultivating implement comprising a frame and an elongated cultivating member rotatably mounted on said frame, said cultivating member being rotatable about a substantially horizontal axis and driving means connected to rotate said member, said cultivating member including a plurality of tines resiliently supported on a central support, said central support being polygonal in cross section and said tines being fastened to corresponding flat sides of the central support around its axis of rotation, each tine comprising an inner fastening portion clamped to a flat side of the support and an outer arcuately curved portion connected to said inner portion through an integral helical coil, said coil being located behind a plane which passes through the outer free end of the corresponding tine and the axis of rotation of said support, each coil comprising at least two substantially complete turns of 360° and the longitudinal axis of each coil intersecting the rotational axis of said support at an acute angle.

2. An implement as claimed in claim 1, wherein each tine, including its corresponding coil, is secured to said support by a clamping member and that member has a greater width at its side adjacent said coil than at its opposite side.

3. An implement as claimed in claim 1, wherein the inner diameter of said coil is not less than substantially equal to the diameter of a circle centered on the rotational axis of said polygonal support, wherein the circle circumscribes corners of said support.

4. An implement as claimed in claim 1, wherein a row of further tines is mounted on said frame in front of the cultivating member and said further tines are resiliently connected to said frame.

5. An implement as claimed in claim 1, wherein a rear row of resilient tines is connected to said frame at the rear of said cultivating member, said row of resilient tines being inclined downwardly and rearwardly relative to the direction of travel from corresponding fastening portions thereof.

* * * * *

United States Patent [19]

Glueck

[11] 4,113,028
[45] Sep. 12, 1978

[54] LIFT FOR DRAGGED IMPLEMENT

[76] Inventor: Robert D. Glueck, Rte 2, Box 122, Chaffee, Mo. 63740

[21] Appl. No.: 787,751

[22] Filed: Apr. 15, 1977

[51] Int. Cl.² ............................................. A01B 25/00
[52] U.S. Cl. .................................. 172/178; 172/398; 172/677; 172/489
[58] Field of Search ............... 172/397, 398, 413, 458, 172/489, 138, 178, 179, 180

[56] References Cited

U.S. PATENT DOCUMENTS

| | | | |
|---|---|---|---|
| 2,613,581 | 10/1952 | Pretzer | 172/178 X |
| 2,970,658 | 2/1961 | Kopaska | 172/397 X |
| 2,994,388 | 8/1961 | Ryan | 172/180 X |
| 3,085,634 | 4/1963 | Hotchkiss | 172/178 X |
| 3,090,447 | 5/1963 | Hotchkiss | 172/178 |
| 3,090,448 | 5/1963 | Hotchkiss | 172/178 |
| 3,314,485 | 4/1967 | Godbersen | 172/178 |

FOREIGN PATENT DOCUMENTS 987,717  4/1951  France ................................. 172/138

*Primary Examiner*—Richard J. Johnson
*Attorney, Agent, or Firm*—Polster, Polster and Lucchesi

[57] ABSTRACT

A lift device is mounted on a wheeled implement such as a disc harrow which has retractable wheels for transport. The lift device includes a pair of arms mounted on a horizontal pivot bar which is rotated by activation of the mechanism for lowering the wheels of the disc harrow. The arms hold a drawbar for a drag harrow when the drag harrow is to be transported and allow the drag harrow to hang vertically behind the disc harrow. In the suspended position, pivots in the arms allow the drag harrow considerable lateral freedom. When the arms are lowered, the drag harrow is released from the arms and dragged by pull lines. Hinges in the arms permit the arms to be folded up onto the disc harrow.

12 Claims, 5 Drawing Figures